United States Patent
Richter-Menge et al.

(10) Patent No.: US 9,315,243 B2
(45) Date of Patent: Apr. 19, 2016

(54) BUOY FOR AUTOMATED DATA COLLECTION AND TRANSMITTAL

(75) Inventors: Jacqueline Richter-Menge, Hanover, NH (US); Donald K. Perovich, Hanover, NH (US); Christopher M. Polashenski, Hanover, NH (US); Bruce C. Elder, Plainfield, NH (US)

(73) Assignee: The United States of America as Represented by The Secretary of The Army, Washington, DC (US)

(*) Notice: Subject to any disclaimer, the term of this patent is extended or adjusted under 35 U.S.C. 154(b) by 5 days.

(21) Appl. No.: 12/569,966

(22) Filed: Sep. 30, 2009

(65) Prior Publication Data

US 2011/0076904 A1    Mar. 31, 2011

(51) Int. Cl.
| | |
|---|---|
| *B63B 22/20* | (2006.01) |
| *B63B 22/24* | (2006.01) |
| *B63B 5/24* | (2006.01) |
| *G01C 13/00* | (2006.01) |

(52) U.S. Cl.
CPC . *B63B 22/24* (2013.01); *B63B 5/24* (2013.01); *G01C 13/00* (2013.01); *B63B 2211/06* (2013.01); *Y02T 70/14* (2013.01)

(58) Field of Classification Search
CPC ........ B63B 22/00; B63B 22/24; B63B 22/18; B63B 22/20; B63B 2241/06; B63B 35/00; B63B 22/003; B63B 5/24; B63B 2022/006; B63B 2203/00; B63B 2211/06; B63B 2213/02
USPC ............................................ 441/21, 1, 11, 28
See application file for complete search history.

(56) References Cited

U.S. PATENT DOCUMENTS

| | | | | |
|---|---|---|---|---|
| 3,455,159 | A | * | 7/1969 | Gies, Sr. .................. 73/170.16 |
| 3,939,510 | A | * | 2/1976 | Curd, Jr. ...................... 441/28 |
| 4,763,126 | A | * | 8/1988 | Jawetz ........................ 340/985 |
| 5,235,337 | A | * | 8/1993 | Clark et al. ..................... 342/51 |
| 5,264,368 | A | | 11/1993 | Clarke et al. |
| 5,308,270 | A | * | 5/1994 | Travor et al. .................. 441/21 |
| 5,532,679 | A | | 7/1996 | Baxter, Jr. |
| 5,654,692 | A | | 8/1997 | Baxter, Jr. et al. |
| 5,767,775 | A | | 6/1998 | Shukla et al. |
| 6,057,773 | A | | 5/2000 | Shukla et al. |
| 6,456,197 | B1 | | 9/2002 | Lauritsen et al. |
| 6,958,693 | B2 | | 10/2005 | Rothgeb et al. |
| 2002/0149996 | A1 | | 10/2002 | Carreiro |
| 2003/0020829 | A1 | | 1/2003 | Croasdale |
| 2004/0004904 | A1 | | 1/2004 | Betts |
| 2004/0208499 | A1 | | 10/2004 | Grober |
| 2005/0162977 | A1 | | 7/2005 | Reifer |
| 2006/0215019 | A1 | * | 9/2006 | Harper .......................... 348/81 |
| 2007/0123122 | A1 | | 5/2007 | Puzella et al. |
| 2007/0212956 | A1 | | 9/2007 | Schmitz, Sr. |
| 2007/0232364 | A1 | | 10/2007 | Troutman |
| 2009/0015262 | A1 | | 1/2009 | Strack et al. |
| 2010/0291817 | A1 | * | 11/2010 | Legnos et al. ................ 441/11 |

* cited by examiner

*Primary Examiner* — Anthony Wiest
(74) *Attorney, Agent, or Firm* — Brian C Jones

(57) ABSTRACT

A buoy for automated collection and transmittal of data. Select embodiments allow calculation of mass balance using data collected from an ice floe. The buoy is adapted to be inserted into the water through an opening in ice so that the buoy floats with the ice floe, the top of the buoy protruding above the surface of the ice floe. The buoy walls are constructed of white PVC. One section of the buoy incorporates closed cell foam for maintaining buoyancy and a bottom section houses a counterweight for maintaining proper orientation of the buoy in the water, the buoy requiring no support from its surrounds while minimally impacting response of the surrounding ice to it. Multiple sensors are incorporated for gathering data and a satellite transmitter transmits the data to a remote user.

15 Claims, 3 Drawing Sheets

US 9,315,243 B2

BUOY FOR AUTOMATED DATA COLLECTION AND TRANSMITTAL

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Johnette Shockley at 402 554-4979.

BACKGROUND

There is interest in monitoring the mass balance of the Arctic sea ice cover, defined as the difference between the mass gained by new ice growth and the amount lost by melting, because the mass balance is a key climate change indicator. If there is a thinning of the ice, this indicates a net warming over time. Conversely, thicker ice results from a net cooling. The mass balance of the sea-ice cover is a function of its extent and thickness, which combine to give its volume. The extent of the sea-ice cover can be monitored from satellites using passive microwave imagery. Changes in ice thickness cannot be monitored as well from satellites. One alternative is to use drifting buoys to collect ice-thickness measurements. Multi-year sea ice has been extensively studied with drifting buoys. However, thin ice (less than two meters thick and not expected to survive) generally classified as seasonal ice, has not been able to be properly studied with drifting buoys.

What is needed is an inexpensive, robust buoy that automatically and inexpensively obtains the high resolution thickness and melt data unavailable from remote sensors. The robust buoy will operate without the need for human observers. The robust buoy will excel in taking data from "first year" (thin) ice. The robust buoy will be deployed down an opening in an ice floe, thus eliminating the need for a team to create multiple holes of different sizes and to carry associated drilling equipment. The robust buoy will float with a strong self-righting moment, enabling its operation in extremely thin ice, and even in the open ocean, with no dependence on ice cover for support. The robust buoy will be self—contained with minimal external wires and protrusions, thus being less vulnerable to damage by ice motion and wildlife. The robust buoy will have minimal effect on surrounding ice, thus enabling accurate multiple measurements on the deployment opening. The robust buoy will comprise material that mimics ice properties, having minimal conductive wiring. Further, convection currents within the robust buoy will be minimized by filler, such as closed cell foam. Finally, the robust buoy may have excessive ballast that facilitates its use as a platform for additional scientific investigations. Select embodiments of the present invention address each of these design considerations.

DETAILED DESCRIPTION

Select embodiments of the present invention comprise a buoy for automated collection and transmittal of sensor data. Specifically, select embodiments collect mass balance data from a thin ice floe drifting in water. The buoy may comprise a housing adapted to be inserted into water through an opening drilled in an ice floe. The buoy floats with the ice floe with the top of its housing protruding above the ice floe. Select embodiments of the present invention incorporate flotation material for maintaining buoyancy and a righting capability to insure the buoy floats upright and requires no support from surrounding ice, thus minimally impacting surrounding ice. Select embodiments of the present invention incorporate a system for gathering data and transmitting it via transmitters or transceivers. Data include input from sensors for calculating mass balance.

Select embodiments of the present invention comprise a method of collecting sensor data with a specially configured buoy. Select embodiments of the present invention collect sensor data from a thin ice floe drifting in water to enable calculating mass balance. Select embodiments of the present invention include a method comprising: a) inserting a buoy into the water through an opening drilled in an ice floe so that the buoy floats with the ice floe and the top of the buoy protrudes above the ice floe; maintaining buoyancy of the buoy; maintaining balance of the buoy to insure orientation of the buoy is upright with no support from surrounding ice and minimal impact to the surrounding ice; and gathering and transmitting data. In select embodiments of the present invention collected data facilitate at least calculation of mass balance.

Figure 1:
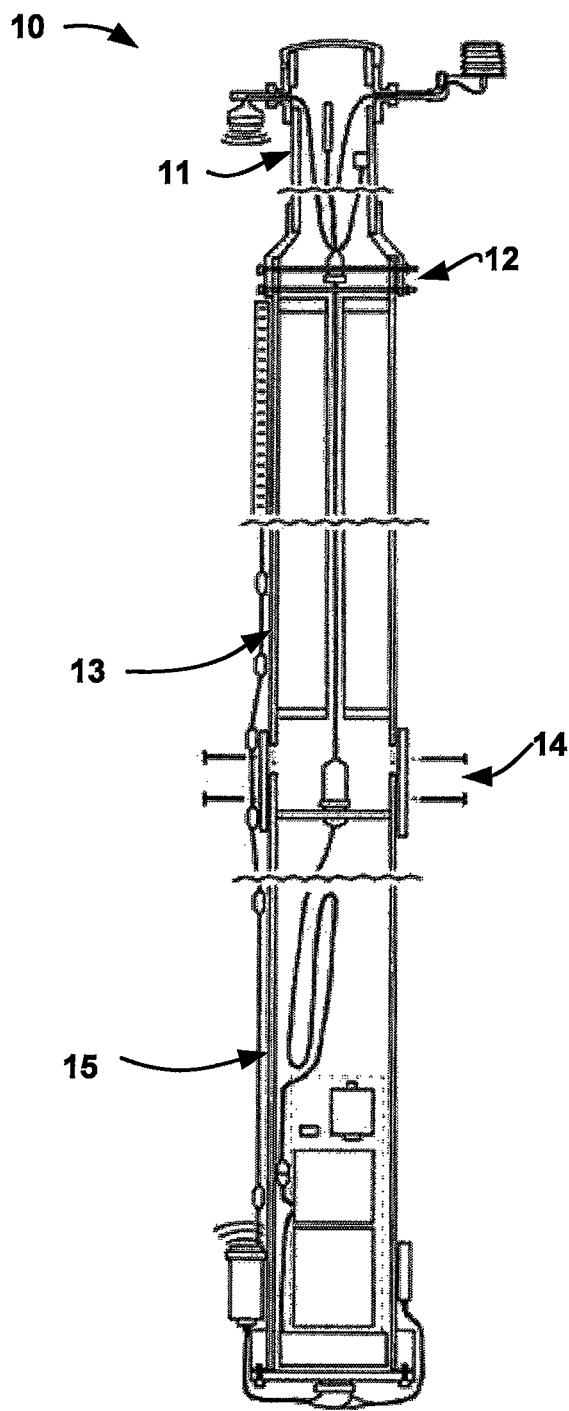
FIG. 1 is a sectional illustration of a select embodiment of the present invention.

Refer to FIG. 1. A buoy 10 comprises a multi-part tubular housing 11, 13, 15 that is adapted to be inserted into water through an opening in an ice floe (not shown separately) so that the buoy 10 floats with the ice floe, the top 11 protruding above the opening. The top section 11 is connected to the middle section 13 via connectors 12 and the middle section 13 is connected to the bottom section 15 via connectors 14. Select embodiments of the present invention employ polyvinyl chloride (PVC) for the housing 11, 13, 15 because thermal properties are similar to ice. A PVC housing 11, 13, 15 does not disturb the thermal gradient in the ice. PVC is also less brittle at low temperatures than other plastics such as ABS or HDPE. For select embodiments of the present invention the housing 11, 13, 15 is painted white to mimic the optical properties of snow and ice, thus reflecting similar amounts of shortwave radiation and not impacting energy balance in the area the buoy is measuring.

The tubular housing 11, 13, 15 has top 11, middle 13 and bottom 15 sections able to be disconnected for ease of handling and transport. In select embodiments of the present invention, the connectors 12, 14 are "quick-locking" mechanisms.

Figure 2:
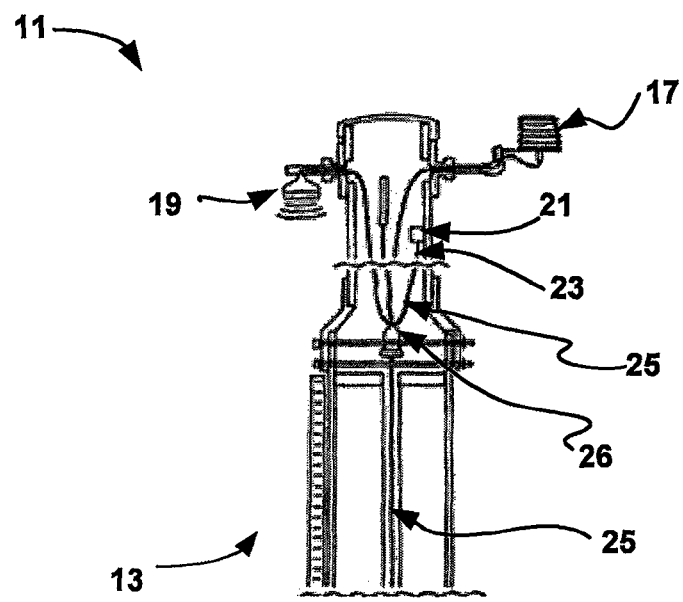
FIG. 2 shows in section a top portion of the embodiment of FIG. 1.

Refer to FIG. 2. In select embodiments of the present invention, the top section 11 houses at least an air temperature sensor 17, a snow depth sensor 19, a barometric pressure sensor 21 and one or more antennas 23. All wires 25 run within the housing 11, 13, 15, protecting them from abrasion, such as from ice breakup, wildlife and the like. The wires 25 are provided with connectors 26 to ease disassembly of the housing sections 11, 13, 15.

Figure 3:
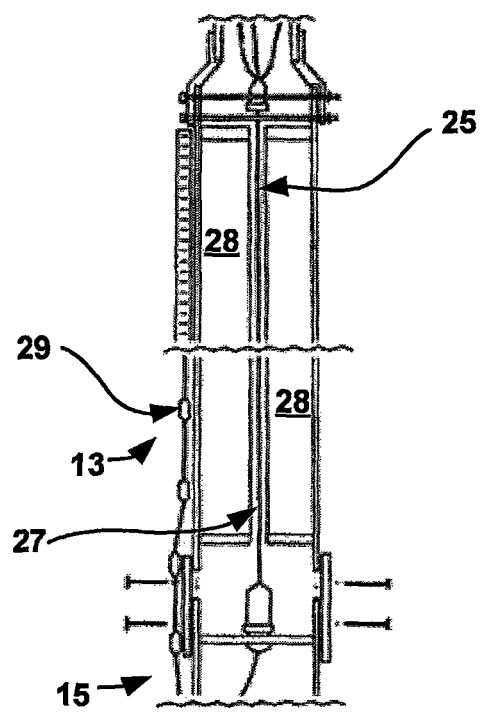
FIG. 3 shows in section a middle portion of the embodiment of FIG. 1.

Refer to FIG. 3. The middle section 13 supports the top section 11. In select embodiments of the present invention, no electronics are enclosed in the middle section 13 and the wires 25 pass through the center of the middle section 13 in a conduit 27. In select embodiments of the present invention, the middle section 13 contains material 28 for maintaining buoyancy of the buoy 10. Select embodiments of the present invention may employ a variety of buoyant-keeping material with a preferred material comprising a closed cell foam such as, for example, a two part pourable urethane foam. The material 28 fills the air space within the middle section and prevents the loss of buoyancy in the event of leakage of water into the housing 11, 13, 15, e.g., through the section connections 12, 14. The material 28 also restricts convective heat transport in the housing 11, 13, 15 since air inside the top section 11 that is colder and denser than air at the bottom section 15 would otherwise sink. In select embodiments of the present invention, one or more strings 29 of thyristors are mounted on the outside of the middle section 13 to provide a temperature profile.

Figure 4:
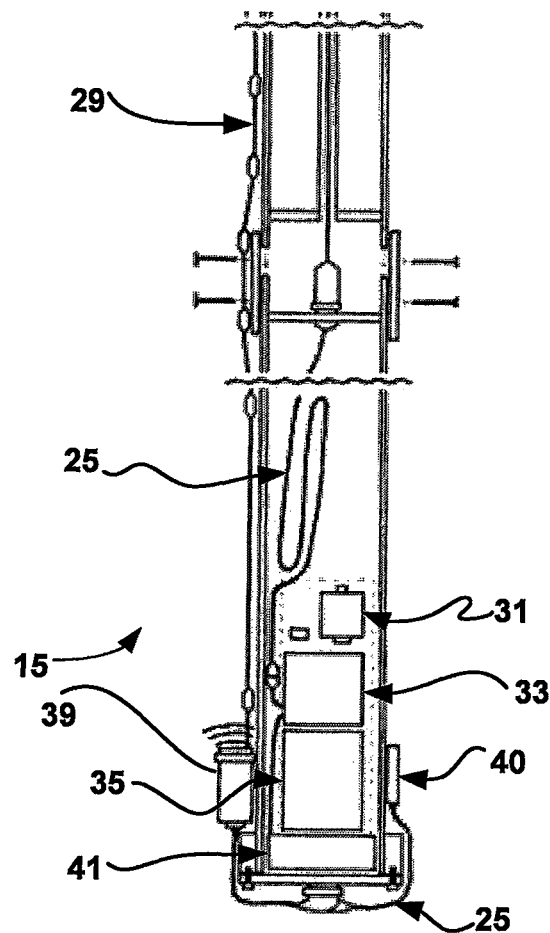
FIG. 4 shows in section a bottom portion of the embodiment of FIG. 1.

Refer to FIG. 4. In select embodiments of the present invention, the watertight bottom section 15 is the control center of the buoy 10. In select embodiments of the present invention, the bottom section 15 contains a satellite transmitter 31, a data logger 33 such as, for example, a Campbell Scientific CR-1000, and a battery pack 35, preferably comprising one or more lithium ion batteries. In select embodiments of the present invention, the data logger 33 incorporates custom software that at least: budgets power, controls data collection, stores data, and packages and sends data to the satellite transmitter 31. The wires 25 enter the bottom section 15 from both the top and bottom. Affixed to the outside wall of the bottom section 15 is a continuation of the thyristor string 29 of the middle section 13, as well as an underwater pressure sensor 40 and an underwater acoustic rangefinder 39 to locate the bottom of the ice floe. The bottom section 15 also includes a "righting device" 41 for keeping the buoy 10 balanced and floating upright so that the housing 11, 13, 15 requires no support from the surrounding ice and minimally affects the ice around it. In select embodiments of the present invention the righting device 41 comprises an iron counter weight disposed in the very bottom of the bottom section 15.

In operation of select embodiments of the present invention, a buoy 10 is inserted into the water through an opening in an ice floe, e.g., a hole drilled in the ice floe by the person emplacing the buoy 10, so that the buoy 10 floats with the ice floe, at least part of the top section 11 protruding above the ice surface. The flotation material 28, e.g., closed cell foam, ensures buoyancy in the event of a leak. The righting device 41, e.g., an iron counterweight, maintains balance to ensure proper orientation of the buoy so that it floats upright, requiring no support from surrounding ice while minimally impacting the ice. In select embodiments of the present invention, sensors gather data, e.g., that data necessary to calculate mass balance, and the data logger 33 sends the data to the transmitter 31, alternatively a transceiver, that transmits data by means of antennas 23 to a satellite network, such as the ARGOS satellite network. In select embodiments of the present invention, the satellite network is linked to a user, such as a scientist or technician in a laboratory. In select embodiments of the present invention, data may include at least location of the snow surface and ice bottom of the ice floe, a temperature profile of the snow, ice, and water, air temperature, snow depth, barometric pressure, and underwater pressure at a fixed distance from the surface of the ice floe. In select embodiments of the present invention, data are post-processed to calculate derivative values that may include ice thickness (both local and integrated over the adjacent ice sheet) and ice melt rate at both the surface and bottom of the ice floe.

The abstract of the disclosure is provided to comply with the rules requiring an abstract that will allow a searcher to quickly ascertain the subject matter of the technical disclosure of any patent issued from this disclosure. 37 CFR §1.72 (b). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for taking balance data from an ice floe, it may apply to any number of applications wherein measurements are taken in a fluid, such as liquids, including water and industrial solutions.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A method for automated collection and transmittal of data from a sea ice floe, said method comprising the steps of:
   selecting a buoy having a white polyvinyl chloride (PVC) housing material that does not disturb a thermal gradient in the ice; and also has optical properties such that said buoy reflects similar amounts of shortwave radiation as surrounding snow and ice, said housing incorporating multiple enclosed sections,
   wherein said housing sections are readily separated for ease of storage and transport;
   buoyant installing material in one of said multiple sections centered approximately midway along a longitudinal axis of said buoy, wherein said buoyant material prevents the loss of buoyancy in the event of leakage of water into said housing and also restricts convective heat transfer in said housing;
   positioning a righting device in the bottommost of said multiple sections;
   wherein said righting device maintains proper orientation of said buoy, said buoy requiring no external support;
   installing electrically powered devices comprising:
      at least one sensor for gathering data;
      at least one data logger in operable communication with said at least one sensor, said data logger for storing said data;
      at least one transmitter in operable communication with said at least one data logger;
      at least one transmitter for transmitting said stored data;
      and at least one antenna in operable communication with said transmitter, said antenna for receiving said data from said transmitter and broadcasting said data;
   installing wiring and releasable wiring connectors for connecting and releasing said electrically powered devices; and
   deploying said buoy down an opening in said sea ice floe.

2. The method of claim 1 said housing sections further comprising a top, a middle and a bottom housing section, said top housing section connected to said middle housing section with first connectors and said middle housing section connected to said bottom housing section with second connectors.

3. The method of claim 2 in which said first and second connectors are quick locking mechanisms.

4. The method of claim 2 in which said at least one sensor includes at least one air temperature sensor, at least one snow depth sensor and at least one barometric pressure sensor incorporated in said top housing section, and at least one underwater pressure sensor and at least one underwater acoustic rangefinder incorporated in said bottom housing section.

5. The method of claim 2 in which said middle housing section incorporates a conduit for wires to pass between said top and bottom housing sections and further incorporates closed cell foam as said buoyant material.

6. The method of claim 2 in which said bottom housing section incorporates said at least one transmitter, said at least one data logger, at least some of said wiring and at least one said releasable wiring connector, at least one battery pack, and said righting device as a counterweight located in the bottom of said bottom housing section.

7. The method of claim 6 in which said at least one battery pack is at least one lithium ion battery pack.

8. The method of claim 6 in which said at least one transmitter is at least one satellite transmitter.

9. The method of claim 1 in which said at least one transmitter is at least one transceiver.

10. The method of claim 1 in which said at least one sensor includes at least one string of thyristors mounted on the outside of said buoy.

11. The method of claim 1, wherein said housing may be inserted into the water through a hole drilled in the ice floe so that said housing floats with the ice floe, the top of said housing protruding above the ice floe.

12. The method of claim 1, wherein said sea ice flow thickness being less than two meters.

13. The method of claim 1 further comprising the step of transmitting data from said buoy transmitter.

14. The method of claim 13 wherein said data is selected from the group consisting of mass balance data; location of a ice bottom of the ice floe; location of a snow surface of the ice flow; a temperature profile of the snow, ice, and water; air temperature, snow depth, barometric pressure, underwater pressure at a fixed distance from a surface of the ice floe; and combinations thereof.

15. The method of claim 1, further comprising steps of maintaining buoyancy of the buoy and maintaining balance of the buoy such that the buoy is oriented upright with no support from surrounding ice.

* * * * *